United States Patent Office 2,943,689
Patented July 5, 1960

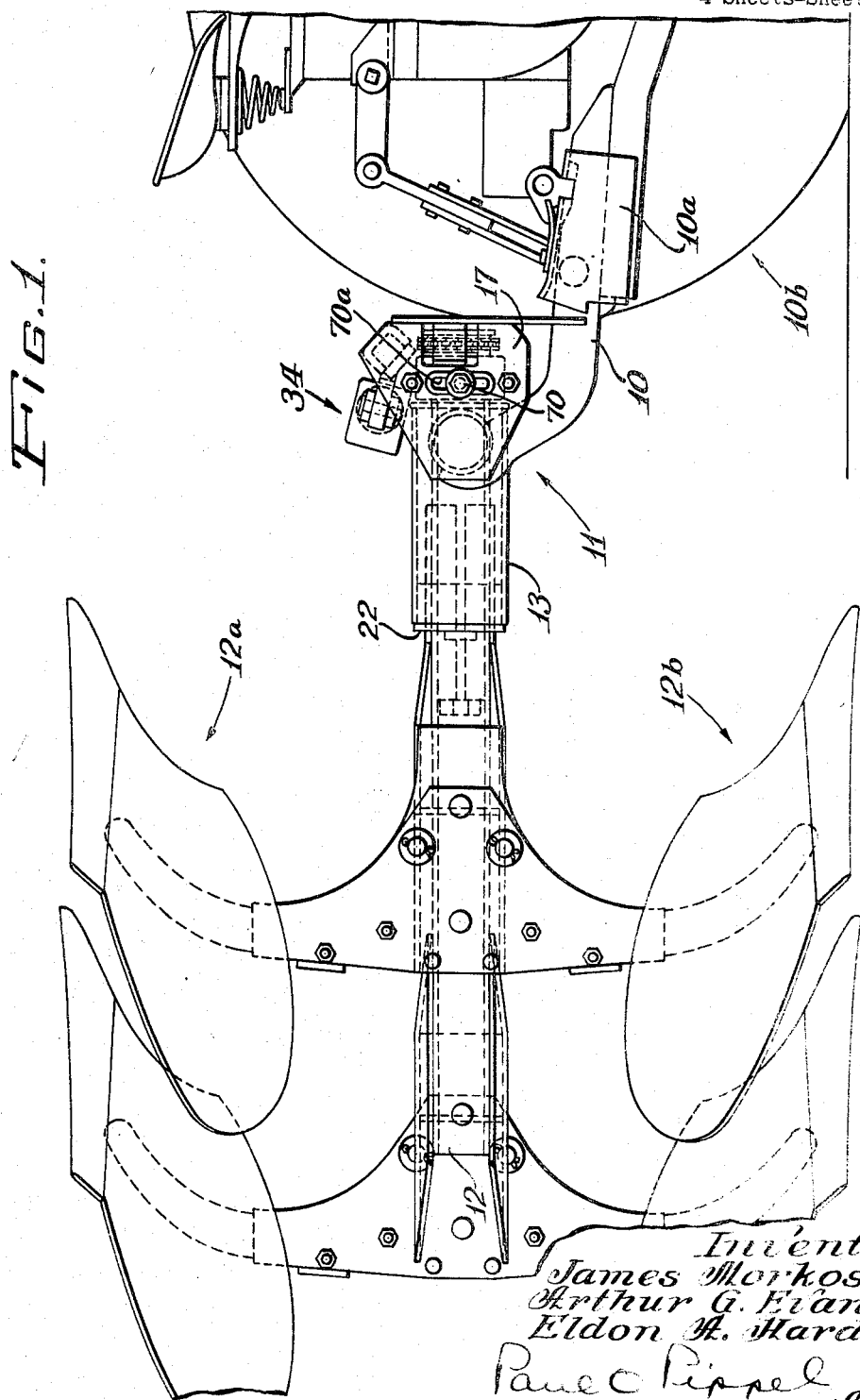

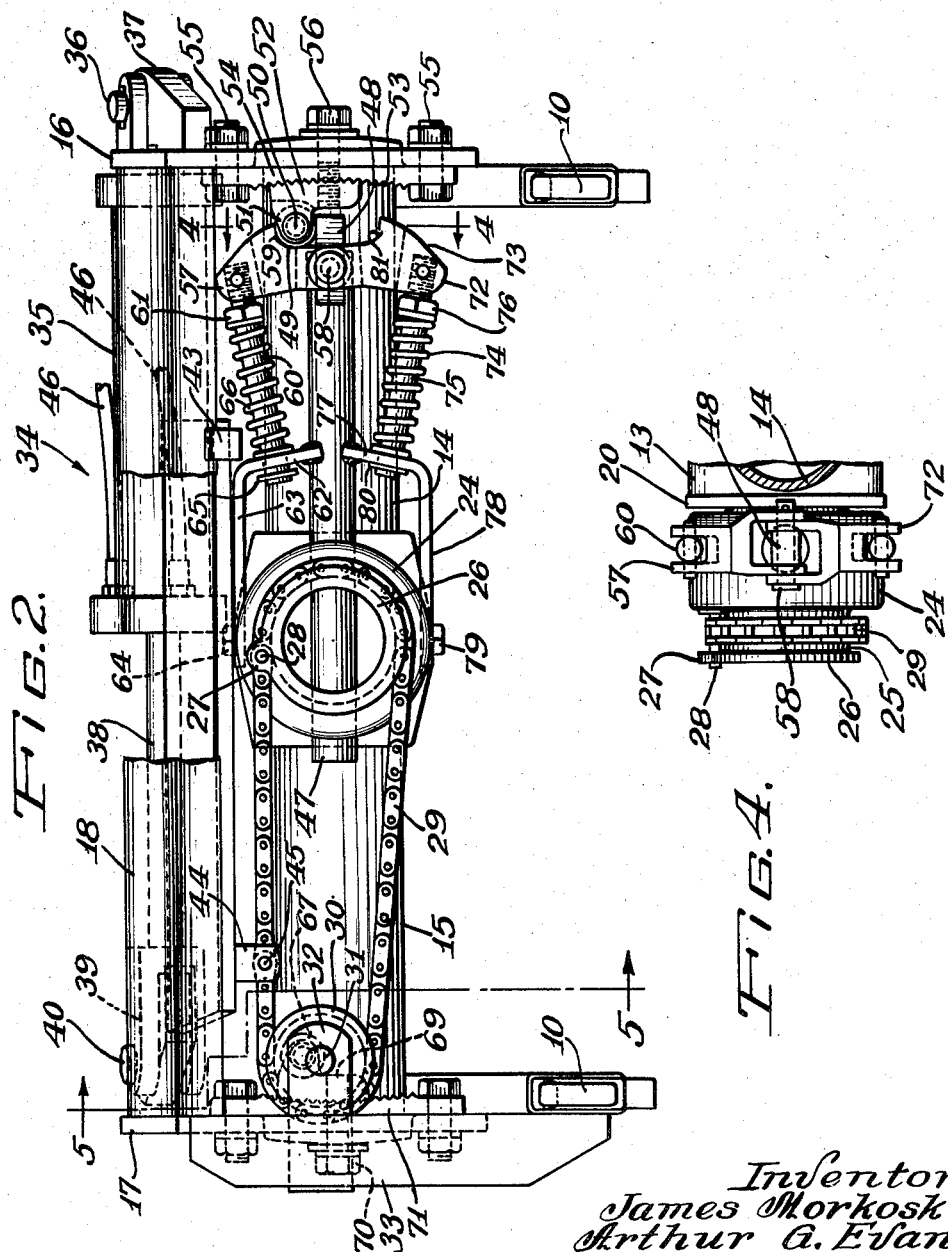

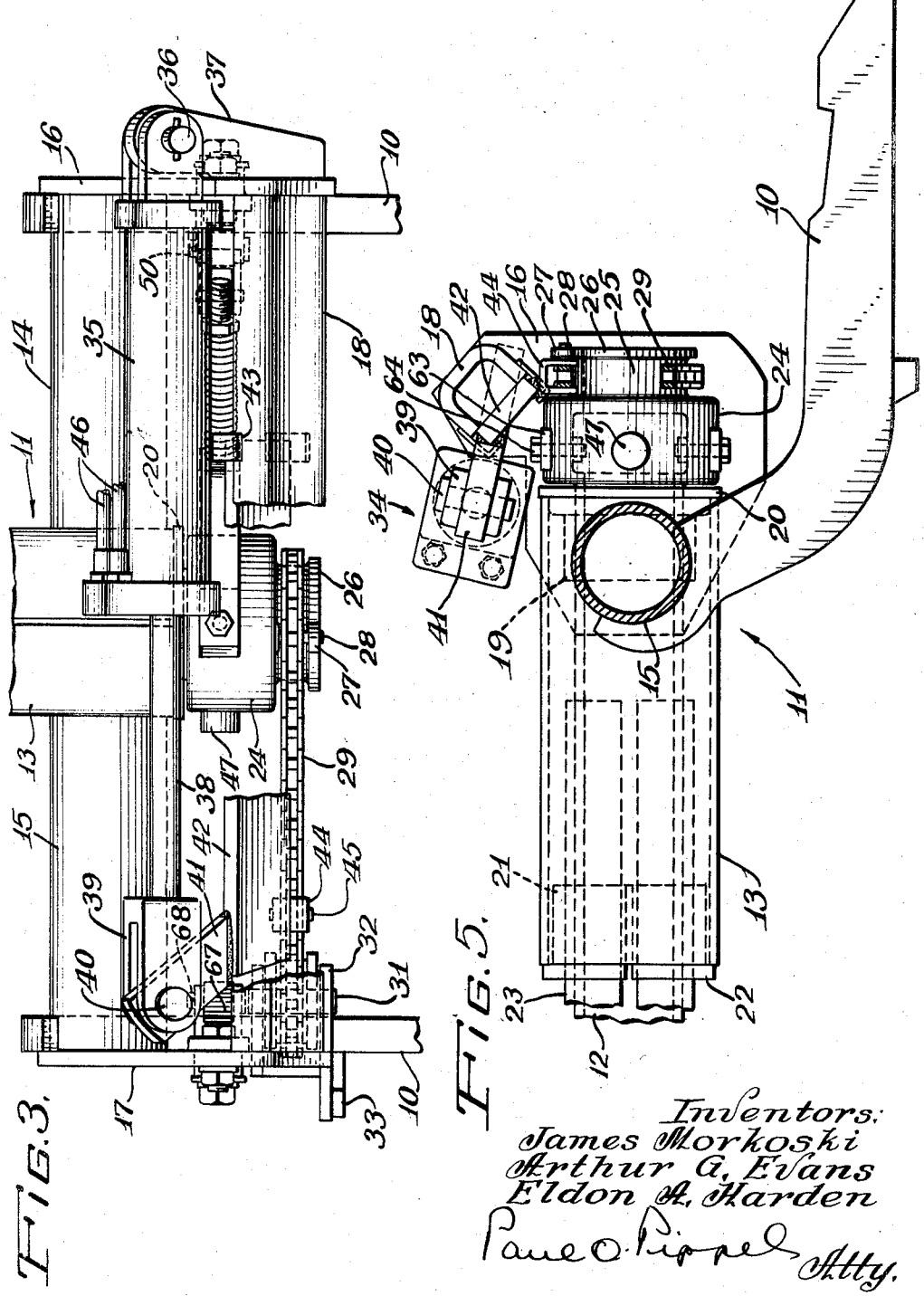

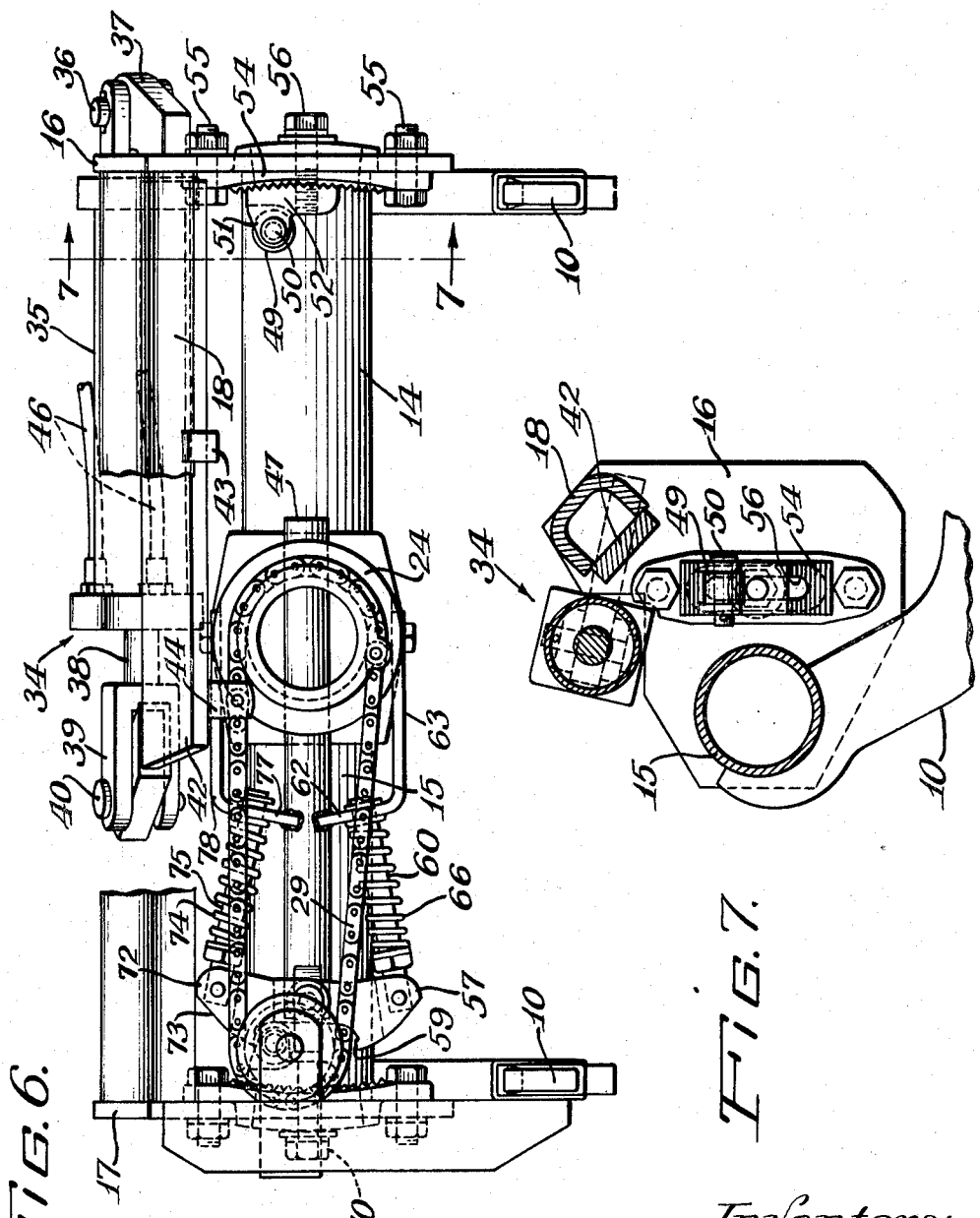

2,943,689

LATCH MEANS FOR TWO-WAY PLOW

James Morkoski, Des Plaines, Arthur G. Evans, Canton, and Eldon A. Harden, Fairview, Ill., assignors to International Harvester Company, Chicago, Ill., a corporation of New Jersey Filed Dec. 12, 1958, Ser. No. 780,118

7 Claims. (Cl. 172—227)

This invention relates to a two-way plow of the type that is rotatable about a longitudinal axis to alternately dispose right and left hand plowing units in operation.

An object of the invention is the provision in a two-way roll-over plow of novel means for holding the selected plowing unit in the plowing position.

Another object of the invention is the provision in a two-way roll-over plow having power means for reversing the operation of the plow units by rotating the plow carrier, of improved latch means for holding the working plow unit in operating position but yieldable in one direction in response to the force exerted by the power means to accommodate rotation of the carrier to dispose the alternately operating plowing unit in operation.

Other objects and advantages of the invention will become clear from the following detailed description when read in conjunction with the accompanying drawings, wherein:

Figure 1 is a view in side elevation of the rear end of a tractor provided with an implement-attaching structure of the two-point type and having mounted thereon a two-way plow of the roll-over type embodying the features of this invention;

Figure 2 is a view from the front of the two-way plow of this invention showing the latching means in one of its latching positions;

Figure 3 is a plan view of the structure shown in Figure 2;

Figure 4 is a section taken on the line 4—4 of Figure 2;

Figure 5 is a section taken on the line 5—5 of Figure 2;

Figure 6 is a view similar to Figure 2, showing the reversed position of the latching means for the plow of this invention; and Figure 7 is a section taken on the line 7—7 of Figure 6.

The plow of this invention is a tractor mounted two-way plow and comprises a pair of laterally spaced forwardly projecting prongs 10 adapted for integral association with complementary hitch members 10a, only one of which is shown, forming a part of a tractor 10b, by which the implement is propelled in operation and upon which it is carried in transport.

The plow structure of this invention includes a main supporting frame 11 and a tool carrier or plow supporting subframe 12 having mounted thereon left and right-hand plow units 12a and 12b, respectively. The main frame 11 comprises a longitudinally extending tubular member 13 having affixed near its forward end and extending laterally therefrom tubular members 14 and 15 having secured to the outer ends thereof plate members 16 and 17, respectively. A transversely extending brace 18 connects the plates 16 and 17.

The central longitudinally extending portion 13 of the main supporting frame is provided at its forward end with an interior bearing 19 having a flange 20 on the outside engaging the forward end of the tubular member 13.

A rear bearing 21 is received in the rear end of member 13 and also has a flange 22 engaging the rear end of the tube.

The tool carrier 12 is an elongated tubular beam, the forward end of which is rotatably receivable in tubular member 13, being separated therefrom at its forward end by the forward bearing 19 and spaced from bearing 21 by steel inserts 23 affixed to the beam 12.

The forward end of the tool carrier or subframe 12 extends beyond the forward end of tubular member 13 and is covered by a bell-shaped housing 24 secured thereto. An extension 25 of the housing 24 projects forwardly therefrom and is provided with a flange 26 having a boss 27 thereon apertured to receive a pin 28 anchored to the housing 24.

Pin 28 is secured to one link of an endless chain 29 trained around the extension 25 between housing 24 and flange 26 and around another wheel 30 mounted on a stud 31 carried by a lug 32 secured to a strap 33 affixed to one of the prongs 10 and to plate 17.

It should be understood that the right and left-hand plow units 12b and 12a are mounted 180 degrees apart on the tool carrier 12 for alternate operation, and that the respective plowing units are brought into an operating position while the alternate unit is raised to a transport position by the rotation approximately 180 degrees of the tool carrier 12. The rotation of the tool carrier 12 to alternately place the plowing units in operation is accomplished by turning the chain 29, and this is accomplished by the provision of a hydraulic ram 34, comprising a cylinder 35 pivotally connected by a pin 36 to a lug 37 affixed to plate 16. The hydraulically operated ram 34 extends transversely of the implement parallel to brace 18 and frame members 14 and 15. Piston rod 38, slidable in the cylinder has a clevis 39 at its end connected by a pivot pin 40 with a lug 41 secured to a guide bar 42 having one end slidable in a track 43 affixed to brace 18, and having a lug 44 affixed to its other end and connected to driving chain 29 by a pin 45. It should be clear that operation of the hydraulic ram 34 drives the chain 29 and causes rotation of the tool carrier 12. Fluid under pressure is supplied to the ram through hose lines 46 to extend and retract the piston rod 38 in the cylinder 35. The fluid under pressure is supplied from a source not shown, on the tractor 12b, by which the implement is propelled, and the extended position of the piston rod 38 shown in Figure 2 corresponds to the operating position of one of the right or left hand plowing units 12b or 12a mounted on the tool carrier 12.

The carrier 12 is held against further rotation in the operating position by locking apparatus comprising an elongated bar or rod 47 having one end passed through openings in the housing 24 and rigidly affixed thereto. Rod 47 extends laterally from the housing 24 and has secured to its outer end a projection 48 engaging the underside of a stop roller 49 mounted on a pin 50 carried by the inwardly projecting arm 51 of a toothed bracket 52 cooperable with the teeth 53 of a member 54 secured to plate 16 by bolts 55. Plate 16 has a slot 56 to adjustably receive a bolt 56a, the end of which is anchored in a suitable threaded opening provided in the bracket 52. By loosening bolt 56, bracket 52 can be vertically adjusted to vary the position at which the projection 48 engages the stop roller 49 and thus vary the working position of the operating plow unit.

Stop roller 49 prevents rotation of the carrier 12 in one direction. Roller 49 limits the rotation of the carrier by engagement thereof with projection 48, and vertical adjustment of the bracket 52 carrying the stop roller levels the plow unit in operation. Relative movement between the projection 48 and stop roller 51 during operation or in transport is prevented by yieldable locking means including a latch element 57 pivotally mounted on a pin 58 carried by the rod 47 and having a hook part 59 adapted to receive the roller 49 at a location sufficiently removed from the axis of pin 58 that pressure of the roller against the hook portion 59 tends to rock the latch element 57 about its axis to release the roller therefrom. Latch element 57 is biased to engagement with the stop roller 49 by a spring pressed rod 60 threaded at one end to receive a nut 61 and pivotally connected at that end to the latch element 57. The other end of rod 60 is slidably receivable in an opening provided in the bent end 62 of a bar 63 secured to the housing 24 by a bolt 64, the bent end 62 being secured as by welding to bar 47. A collar 65 secured to the end of bolt 60 prevents displacement thereof from the bar 63. A coil spring 66 surrounds rod 60 between nut 61 and the bent end 62 of bar 63. Pressure is exerted by spring 66 to yieldably urge latch element 57 into engagement with the roller 49 to hold the roller therebetween and the projection 48 and prevent rotation of the carrier in either direction.

Latch element 57 is automatically released from engagement with the stop roller 49 when the hydraulic ram 34 is actuated to rotate the carrier 12 and raise the operating plow unit to a transport position while moving the alternately operating set of plows into operating position when the direction of operation of the implement is reversed. To do this the carrier 12 is revolved approximately 180 degrees, and, as viewed in Figure 6, the extended cylinder and piston unit is retracted. Upon retraction of the piston rod 38 in the cylinder 35, downward pressure is exerted against stop roller 49 by the hook portion 59 of latch element 57. The bias of spring 66 is overcome in the initial rotation of the tool carrier and the roller 49 rolls over latch element 57. Continued rotation of the carrier 12 occurs in a clockwise direction, as viewed in Figure 2, carrying with it the housing 24, rod 47, and latch element 57 until the carrier has rotated approximately 180 degrees to the position of Figure 6. This places the alternately operating plow unit in operating position and rotation of the carrier continues until the projection 48 on rod 47 engages a roller 67 mounted on a pin 68 carried by a bracket 69, substantially a duplicate of bracket 52 and similarly adjustably secured by a bolt 70 to a toothed member 71 secured to plate 17 having a slot 70a to receive the bolt.

A latch element 72, a substantial duplicate of latch element 57, is also mounted on the pivot pin 58 in substantially vertical alignment with element 57.

Upon rotation of the tool carrier 12 approximately 180 degrees from the position shown in Figure 2, stop roller 67 on the opposite side of the tool frame engages the curved outer surface 73 of latch element 72 and rocks it about its pivot 58 against the action of a spring 74 surrounding a rod 75, a duplicate of rod 60 and pivotally connected at one end to the element 72 as shown in Figure 6. Spring 74 engages a nut 76 at one end, and at its other end the bent end 77 of a bar or strap 78 secured by a bolt 79 to the housing 24. A collar 80 on the end of rod 75 prevents displacement thereof from the strap 78. Thus latch element 72 is swung inwardly about the axis of pin 58 upon engagement thereof with stop roller 67 until the latter is engaged by the projection 48, whereupon the latch element 72 swings into place with the hook portion 81 thereof engaging the other side of the roller to yieldably prevent movement of the projection 48 away from the stop roller 67.

Upon again reaching the end of the field being plowed, the hydraulic ram 34 is again actuated by extension of piston rod 38 in the cylinder 35 to overcome the bias of spring 75 against latch element 72, releasing the latter to permit the tool carrier to again be reversed.

It should be clear that the locking of the plow carrier in its alternate operating position is automatic upon revolving the plow carrier from one operating position to another, and that the release of the locking means for the plow carrier is also automatic upon actuation of the power means for turning the tool carrier.

The latching apparatus herein described is much simpler and more economical than previous devices for locking a two-way plow in position, and is fully automatic while minimizing the danger of breakage or failure in more complicated apparatus.

It should also be understood that the invention has been described in its preferred embodiment and that modifications may be made therein without departing from the spirit of the invention or the scope of the appended claims.

What is claimed is:

1. In a two-way plow including a relatively stationary frame having a central longitudinally extending beam portion and a plow carrier mounted on said beam and having right and left-hand plow bottoms thereon alternately movable into operating position by rotation of the plow carrier, power means operatively connected to the carrier for rotating the latter and latching means affixed to the carrier including a member movable with respect to the carrier, and a stop on the relatively stationary frame engageable with said movable member to hold the carrier against rotation, said member being yieldable to the pressure thereof against said stop upon rotation of the carrier to a position out of engagement with said stop.

2. The invention set forth in claim 1, wherein said movable member is a lever fulcrumed on the carrier having a part engageable with said stop at a location laterally removed from its fulcrum and wherein a spring anchored at one end to the carrier engages the lever to urge the latter into engagement with said stop.

3. In a two-way plow including a relatively stationary frame having a central longitudinally extending beam portion, a plow carrier mounted on the beam having right and left-hand plow bottoms thereon alternately movable into operating position by rotation of the plow carrier and power means operatively connected to the carrier for rotating the latter, latching means for holding the carrier in the alternate positions thereof, comprising a stop member secured to the frame on one side of the carrier, a projection on the carrier rotatable therewith and engageable with one side of said stop to hold the carrier against rotation in one direction in one of the operating positions thereof, a rockable latch element pivotally mounted on said projection for rocking movement relative thereto into and out of the engagement with the other side of said stop to hold the carrier against rotation in the other direction, and spring means biasing said latch element into engagement with the stop, said latch element being yieldable in response to pressure exerted against the stop by rotation of the carrier.

4. In a two-way plow including a relatively stationary frame having a central longitudinally extending beam portion, a plow carrier mounted on the beam having right and left-hand plow bottoms thereon alternately movable into operating position by rotation of the plow carrier and power means operatively connected to the carrier for rotating the latter, latching means for holding the carrier in the alternate positions thereof, comprising a stop member secured to the frame on each side of the carrier, a projection on the carrier rotatable therewith and engageable with one side of each of said stops to hold the carrier against rotation in one direction in the alternate operating positions of said plows, a pair of rockable latch elements pivotally mounted on said projection for rocking movement relative thereto into and out of engagement with the other side of the respective of said stops to hold the carrier against rotation in the other direction, and spring means biasing said latch elements into engagement with said stops, said elements being yieldable in response to pressure exerted against the stops by rotation of the carrier.

5. In a two-way plow including a frame having a central longitudinally extending beam portion and a plow carrier mounted on said beam portion for rotation about a longitudinal axis and having right and left-hand plows thereon alternately movable into operating position by rotation of the plow carrier, relatively stationary laterally spaced latching elements mounted on the frame on opposite sides of said beam portion, and a latching member mounted on and projecting laterally from one side of said carrier into cooperative relation with one of said elements, comprising a stop member engageable with one side of said one of said elements to hold the plow carrier against rotation about said axis in one direction, a movable latch part mounted on said member, biasing means connected between said latch member and said movable part arranged to urge the latter into cooperative engagement with the other side of said relatively stationary element to hold the plow carrier against rotation in the other direction, and means operatively connected to said plow carrier for rotating the latter, said biasing means being yieldable to accommodate moving said movable latch part out of latching relation to said relatively stationary element in response to pressure of the movable part against said stationary element upon rotation of the plow carrier.

6. In a two-way plow including a frame having a central longitudinally extending beam portion and a plow carrier mounted on said beam portion for rotation about a longitudinal axis and having right and left-hand plows thereon alternately movable into operating position by rotation of the plow carrier, relatively stationary laterally spaced latching elements mounted on the frame on opposite sides of said beam portion, and a latching member mounted on and projecting laterally from one side of said carrier into cooperative relation with one of said elements, comprising a rockable latch part pivotally mounted on said latching member, biasing means connected between the latching member and said part arranged to urge the latter into cooperative engagement with said relatively stationary element to hold the plow carrier against rotation, said biasing means being yieldable to accommodate rocking said rockable latch part out of latching relation to said relatively stationary element in response to pressure of the rockable part against said stationary element upon actuation of said power means to turn the plow carrier.

7. In a two-way plow including a frame having a central longitudinally extending beam portion and a plow carrier mounted on said beam portion for rotation about a longitudinal axis and having right and left-hand plows thereon alternately movable into operating position by rotation of the plow carrier, relatively stationary laterally spaced latching elements mounted on the frame on opposite sides of said beam portion, and a latching member mounted on and projecting laterally from one side of said carrier into cooperative relation with one of said elements, comprising a stop member engageable with one side of said one of said elements to hold the plow carrier against rotation about said axis in one direction, a rockable latch part pivotally mounted on said member, biasing means connected between said latch member and said rockable latch part arranged to urge the latter into cooperative engagement with the other side of said relatively stationary element to hold the plow carrier against rotation in the other direction, and power means operatively connected to said plow carrier for rotating the latter, said biasing means being yieldable to accommodate rocking said rockable latch part out of latching relation to said relatively stationary element in response to pressure of the rockable part against said stationary element upon actuation of said power means to turn the plow carrier.

References Cited in the file of this patent
UNITED STATES PATENTS

| | | |
|---|---|---|
| 2,625,089 | Pursche | Jan. 13, 1953 |
| 2,780,157 | Pursche | Feb. 5, 1957 |